United States Patent
Lauper et al.

(12)
(10) Patent No.: US 6,456,039 B1
(45) Date of Patent: Sep. 24, 2002

(54) INTERCHANGEABLE BATTERY WITH ADDITIONAL COMMUNICATIONS CAPABILITIES FOR MOBILE TELEPHONES

(75) Inventors: Eric Lauper; Rudolph Ritter, both of Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/997,367

(22) Filed: Nov. 30, 2001

Related U.S. Application Data

(63) Continuation of application No. PCT/CH99/00266, filed on Jun. 18, 1999.

(51) Int. Cl.[7] .................. H01M 10/44; H01M 10/46
(52) U.S. Cl. ............................................. 320/107
(58) Field of Search ...................... 320/106, 107, 320/110, 112, 114

(56) References Cited

U.S. PATENT DOCUMENTS

| | | | |
|---|---|---|---|
| 5,153,600 A | * | 10/1992 | Metzler et al. |
| 5,612,532 A | * | 3/1997 | Iwasaki |
| 5,786,789 A | | 7/1998 | Janky |
| 6,341,217 B1 | * | 1/2002 | Wong |

FOREIGN PATENT DOCUMENTS

| | | |
|---|---|---|
| WO | WO 98/58510 | 12/1998 |

\* cited by examiner

*Primary Examiner*—Edward H. Tso
(74) *Attorney, Agent, or Firm*—Pearne & Gordon LLP

(57) ABSTRACT

The interchangeable battery (2) for mobile radio telephones (3) comprises battery cells in a housing and electric feeding contacts (22) for powering the mobile telephone (3) as well as a radio interface (20–21), for example a RFID element, a GPS receiver, a radio clock signal receiver etc.

Different batteries, which each operate according to another communication protocol, can be provided.

25 Claims, 1 Drawing Sheet

INTERCHANGEABLE BATTERY WITH ADDITIONAL COMMUNICATIONS CAPABILITIES FOR MOBILE TELEPHONES

This application is a continuation of PCT Application No. PCT/CH99/00266 filed Jun. 18, 1999.

FIELD OF THE INVENTION

The present invention relates to an interchangeable battery for mobile radio telephones. In particular, the present invention relates to a battery with additional communication possibilities.

RELATED ART

Mobile radio telephones are more and more used also for data communication and additional services such as VAS (Value Added Services). For this purpose, programs and data are stored in storage areas of the telephone and/or in an identification card inserted in the telephone. Mobile telephones however usually have only very small keys and controls, so that only very short entries can be made with such keys, which strongly restricts the utilization possibilities of mobile telephones.

Mobile telephones have therefore been proposed that have, in addition to the mobile radio part, a contactless interface, for example an inductive or infrared interface, with which they can communicate with external devices, for example with computers, palmtops or POS (Point-of-Sale), that have better input means. A mobile telephone with such an interface was described among others in patent applications WO9858510A1 and WO9837524A1.

There are presently many different standards for contactless interfaces and new protocols are regularly developed and proposed. Commercially available mobile telephones however have at most one contactless interface of a particular type, so that it can communicate only with external devices of this type. Furthermore, mobile radio telephones become obsolete as soon as the communication protocol provided is outdated.

It is thus an aim of the present invention to propose a mobile telephone that is suited for the transmission of data with external devices according to a plurality of different standards.

It is a further aim of the invention to propose a mobile telephone that does not have the shortcomings of prior art devices.

BRIEF SUMMARY OF THE INVENTION

According to the invention, these aims are achieved in particular by means of an interchangeable battery for mobile radio telephones having the characteristics of the characterizing part of claim 1, and by means of a mobile telephone having the characteristics of the independent mobile telephone claim.

In particular, these aims are achieved by means of an interchangeable battery comprising a radio interface.

Because the contactless interface is fitted on a detachable and commercially easily available part of the mobile device, it is possible for the user to simply replace the battery with another one in order to communicate with different external devices according to various different protocols.

The radio interface preferably consists of a known RFID (Radio Frequency Identification) element, comprised for example of an antenna, for example a coil, and a communication controller. Such a RFID element allows the mobile telephone to communicate with external devices, for example with devices in the same room, in both directions.

U.S. Pat. No. 5,786,789 describes a GPS unit with a battery, in which a mobile radio telephone is integrated, as well as a mobile radio telephone with a battery, in which a GPS receiver is mounted. These combination devices can not be used in order to establish bi-directional connections with external devices at close range.

Additional contacts allow the battery to communicate with the mobile telephone. In a variant embodiment, it can communicate with the mobile telephone through modulation of the feeding voltage. In another variant embodiment, it can communicate with the mobile telephone over an additional contactless interface.

DESCRIPTION OF THE DRAWINGS

Preferred embodiments of the invention will be described hereafter in more detail with the aid of the attached drawings, in which.

DETAILED DESCRIPTION OF THE INVENTION

Figure 1:
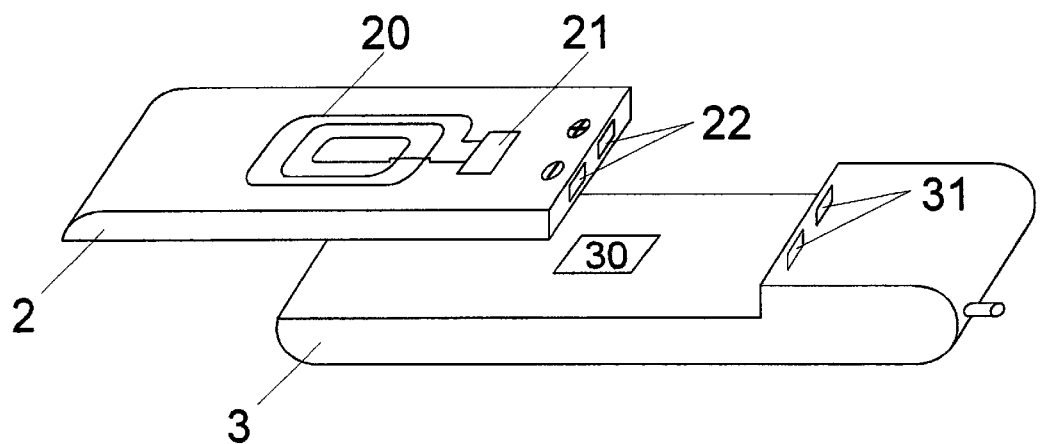
FIG. 1 shows a diagrammatic and perspective view of a mobile telephone with a battery according to an embodiment of the invention.
Figure 2:
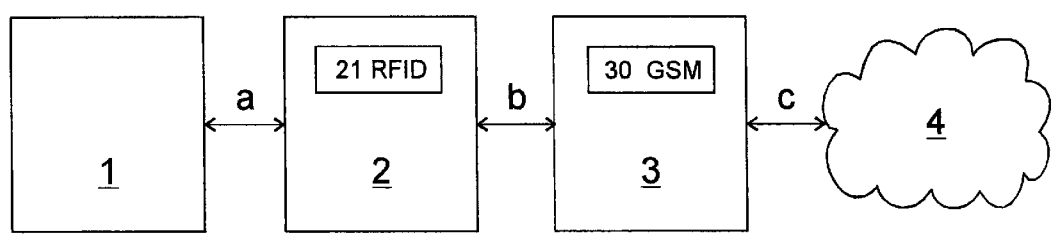
FIG. 2 shows a diagrammatic view of the system according to the invention.

FIG. 1 shows a mobile radio telephone 3, for example a GSM or UMTS digital mobile radio telephone, that can be used in a digital mobile radio network 4. The mobile radio telephone contains conventional components (not represented) such as radio part, display, microphone and loudspeaker, control elements, antenna, infrared interface etc. as well as, preferably, a removable identification module 30 with data processing means, for example a SIM (Subscriber Identification Module) card.

The mobile telephone 3 is powered by an interchangeable battery 2, for example a Li-ion battery cell, that is lodged in a housing and that powers the mobile telephone through feeding contacts 22 and 31. Known fastening means, for example snap or spring fastening means, allow the user to exchange and replace the battery without much effort.

According to the invention, the battery 2 has a radio interface that allows direct communication with an external device 1. In the represented example, the interface comprises an integrated circuit (communication controller) 21 and an antenna 20, which in this example consists of a coil. The interface thus consists in this variant embodiment of an element known by the acronym RFID (Radio Frequency Identification), which allows connections with external devices over electromagnetic waves up to several meters.

RFID components are known as such and function according to two different basic principles. The first type of RFID element uses magnetic fields and a frequency up to several GHz, for example 13,56 MHz. The antenna consists in these elements of a coil and the maximum range is typically 4 meters. Other RFID components use electric fields that allow a greater range but are usually more expensive. Under the terms radio interface and RFID, both kinds of RFID elements are included in the framework of this application.

RFIDs are used for many different applications, among others for access control (Personal Access), ski lifts, credit cards and money transactions, user identification in a network etc. Accordingly, many different frequencies and not always standardized transmission protocols are used for these applications. According to the invention, the user can simply replace the battery of his mobile telephone in order to communicate with external devices over different protocols. New batteries can be acquired when new communication standards become established or when new needs arise; it is however not necessary to replace the whole mobile telephone.

Batteries that can each communicate over different protocols and frequencies can also be proposed in the framework of this invention, so that users do not have to acquire too large a number of batteries. For this purpose, such multi-function and multi-protocol batteries are provided with a plurality of antennas/coils 20 and/or with a plurality of controllers 21.

According to the application, the communication controller 21 can execute different programs. Preferably, the communication controller has an interpreter, for example a JAVA interpreter with JINI capabilities, in order to execute instructions in received messages in an object-oriented language.

A possible application of RFID elements is identification. External readers 1 send a query a, to which the controller 21 replies with its own identification stored in a storage area of the controller 21. The reader 1 thus knows with which device 2 it communicates and can correspondingly carry out different activities, for example open a door, allow access to a computer or network, register the presence of a user etc. More complex processes allow for example the transmission of electronic money between a storage area of the controller 21 and the external device 1. Such processes are preferably secured electronically in a protected form, for example encrypted, signed and/or authenticated with an electronic signature.

In a variant embodiment of the invention, the battery 2 can have a chip-card reader in which for example an identification card can be stored. This card allows a reliable identification of the user, also independently from the identification in the module 30.

According to the invention, more complex processes can be realized when the communication controller 21 can communicate with the mobile telephone 3 and the identification module 30. In a preferred embodiment of the invention, data, for example user identification, biometric parameters of the user, programs, applets, electronic money payments etc., can in this manner be transmitted in both directions between the data processing means 21 in the battery 2 and the identification module 30. Through this channel, the external device 1 can also communicate with the processor in the identification module 30 and access these data. The display of the mobile telephone 3 can then be used to display data, texts and images from the external device while the external device can be controlled with the keys and input means of the mobile telephone.

Over the battery 2 and the mobile device 3, the external device can even communicate with devices in the digital mobile radio network 4 and for example send and receive data as SMS (Short Message System), USSD (Unstructured Supplementary Service Data), e-mails and/or in the utility channel. The mobile telephone in this embodiment serves as relay between the external device 1 and the mobile radio network 4; according to the application, data can be converted in the mobile telephone 3, for example in the identification module 30, or transmitted in transparent mode.

For this purpose, in a first embodiment of the invention, new contacts (not represented) for this communication between the communication controller 21 and the mobile telephone 3 are provided in addition to the represented feeding contacts 22. In another variant embodiment of the invention, this communication takes place through modulation of the feeding voltage transmitted over said feeding contacts; for this, a modulation element must be provided in the battery 2 and in the mobile radio telephone 3. In a further variant embodiment, this communication takes place over an additional contactless interface in the battery 2 and in the identification module 30, for example over two superimposed coils.

The radio interface 20, 21 can be powered according to the application either by the external device 1 or by the battery cells in the battery 2, preferably also when the mobile telephone is switched off. In a variant embodiment of the invention, the communication controller 21 can be activated by the external device 1, so that the mobile telephone remains in a stand-by mode except when a signal from an external device 1 is received. In a further embodiment of the invention, the external device 1 can also rouse the mobile telephone from the stand-by state. Preferably, the mobile telephone or messages received from the mobile telephone can wake the controller 21.

The one skilled in the art will understand that many different kinds of radio interfaces can be included in the battery. Apart from the already mentioned RFID elements, GPS (Global Positioning System), radio, DAB (Digital Audio Broadcasting) or radio clock signal receivers can for example be proposed. Over the mentioned interface, the received data, for example location information, time information or digital data accompanying a DAB radio program, can be transmitted to the mobile telephone 3 or to the identification module 30 and processed, reproduced or stored there. With such batteries, for example the duration and the time of processes and connections can be determined very accurately in the mobile device and these processes and connections can be determined in this manner.

Batteries with radio interfaces having a high transfer rate and compatible with different devices, can also be proposed. For example, batteries with a radio interface according to the Bluetooth standard can be proposed.

An authentication process with a digital signature generated from a personal electronic certificate can preferably be used between the battery and the mobile telephone. Thanks to this process, it can be among others ensured that the battery belongs to the owner of the identification module 30, so that the user of the mobile device can be reliably identified in the mobile radio network 4 with the electronic certificate stored in the battery 2.

In another variant embodiment of the invention, the user's identity, for example his identity in the mobile network 4, as well as other useful data and parameters can automatically be copied in a suitable storage area of the battery as soon as the mobile device is switched on. Suitable mechanical or electromechanical means are provided to check whether the battery is separated from the mobile telephone. The copy of the data and parameters in the battery can then be used for communication with an external device 1, as long as the battery 2 is not separated from the mobile telephone 3. These parameters can preferably also be used when the mobile telephone is switched off. If these data can be modified during communication with an external device 1, as for example monetary amounts, a suitable synchronization mechanism must be provided so that the data in the battery 2 correspond to the data in the module 30.

What is claimed is:

1. Interchangeable battery (2) for a mobile radio telephone (3), comprising battery cells in a housing and electric feeding contacts (22) for powering the mobile telephone (3),
wherein said battery (2) includes a radio interface (20–21) designed for bi-directional connections over electromagnetic waves.

2. The battery of claim 1, wherein said radio interface consists of a Radio Frequency Identification element.

3. The battery of claim 2, wherein said Radio Frequency Identification element comprises at least one antenna (20).

4. The battery of claim 3, wherein said Radio Frequency Identification element comprises a plurality of antennas (20) in order to communicate over different frequencies and/or different communication protocols.

5. The battery of claim 1, wherein said Radio Frequency Identification element is powered by said battery cells.

6. The battery of claim 1, wherein said Radio Frequency Identification element comprises at least one communication controller (21).

7. The battery of claim 6, wherein said Radio Frequency Identification element comprises a plurality of communication controllers (21) in order to communicate over different frequencies and/or different communication protocols.

8. The battery of claim 6, wherein said communication controller (21) comprises an interpreter, in order to execute received instructions in an object-oriented or procedural language.

9. The battery of claim 6, wherein said communication controller (21) has a stand-by mode.

10. The battery of claim 6, wherein said communication controller (21) can be roused from the stand-by mode through signals received over said radio interface (20–21).

11. The battery of claim 6, wherein said communication controller (21) can be roused from the stand-by mode by the mobile telephone (3).

12. The battery of claim 1, wherein it comprises a storage area for storing the user's identity.

13. The battery of claim 12, wherein said identity comprises biometric parameters of the user.

14. The battery of claim 12, wherein said identity comprises an electronic certificate of the user.

15. The battery of claim 14, wherein it further comprises data processing means (21) for the signing of electronic communication.

16. The battery of claim 1, wherein it comprises a storage area for storing monetary amounts transmitted over the contactless interface.

17. The battery of claim 1, wherein it further comprises electric contacts for communication between said Radio Frequency Identification element (22) and said mobile radio telephone (3).

18. The battery of claim 1, wherein it comprises a modulation element connected with said Radio Frequency Identification element for modulating the feeding voltage transmitted over said feeding contacts (22).

19. The battery of claim 1, wherein it comprises an additional contactless interface for communication between said Radio Frequency Identification element and said mobile radio telephone.

20. The battery of claim 1, wherein it comprises an adapter module for a chip-card.

21. The battery of claim 1, wherein said radio interface operates according to the Bluetooth standard.

22. Set of different batteries (2) according to one of the preceding claims, the housing and the electric feeding contacts (22) of all batteries in the set being compatible with the same model of mobile telephone (3),
wherein each battery (2) comprises a radio interface operating according to another protocol.

23. Mobile radio telephone (3) with the following components:
an interchangeable battery (2), comprising battery cells in a housing, electronic data processing means as well as a radio interface (20–21) designed for bi-directional connections over electromagnetic waves,
electric feeding contacts (22–31) for powering the mobile telephone (3) through said battery,
an additional interface for communication between said mobile radio telephone and said electronic data processing means (21).

24. The mobile radio telephone of claim 23, wherein it has a stand-by mode and wherein it can be roused from the stand-by mode through signals received over said radio interface (20–21).

25. Communication method between a mobile radio telephone (3) and an external device (1), wherein the communication takes place bi-directionally over a radio interface (20, 21) in the battery (2) of said mobile telephone (3).

* * * * *